(12) United States Patent
Shen et al.

(10) Patent No.: US 7,793,080 B2
(45) Date of Patent: Sep. 7, 2010

(54) PROCESSING PIPELINE HAVING PARALLEL DISPATCH AND METHOD THEREOF

(75) Inventors: Gene Shen, San Jose, CA (US); Sean Lie, Santa Clara, CA (US)

(73) Assignee: Globalfoundries Inc.

( * ) Notice: Subject to any disclaimer, the term of this patent is extended or adjusted under 35 U.S.C. 154(b) by 320 days.

(21) Appl. No.: 11/967,924

(22) Filed: Dec. 31, 2007

(65) Prior Publication Data

US 2009/0172359 A1   Jul. 2, 2009

(51) Int. Cl.
G06F 9/30 (2006.01)
(52) U.S. Cl. ........................ 712/215; 712/212
(58) Field of Classification Search ................ 712/214, 712/215, 212
See application file for complete search history.

(56) References Cited

U.S. PATENT DOCUMENTS

| | | | | |
|---|---|---|---|---|
| 5,051,885 | A * | 9/1991 | Yates et al. | 712/215 |
| 5,193,158 | A * | 3/1993 | Kinney et al. | 712/244 |
| 7,209,996 | B2 | 4/2007 | Kohn et al. | |
| 2003/0023834 | A1 | 1/2003 | Kalafatis et al. | |
| 2003/0046517 | A1 | 3/2003 | Lauterbach | |
| 2004/0210742 | A1 | 10/2004 | Levitan et al. | |
| 2006/0265555 | A1* | 11/2006 | Davis et al. | 711/147 |
| 2008/0263325 | A1 | 10/2008 | Kudva et al. | |

FOREIGN PATENT DOCUMENTS

| | | |
|---|---|---|
| EP | 1555610 A1 | 7/2005 |
| WO | 03058501 A1 | 7/2003 |

OTHER PUBLICATIONS

International Search Report for PCT/US2008/013302 dated Jun. 2, 2009, 4 pages.
Omondi, A. R. et al., "Performance of a context cache for a multithreaded pipeline," Journal of Systems Architecture, Elsevier Science Publishers BV., Amsterdam, NL, vol. 45, No. 4, Dec. 1, 1998, pp. 305-322.
Written opinion of the international preliminary examing authority, for PCT/US2008/013302 dated Jan. 26, 2010, 5 pages.
U.S. Appl. No. 11/967,923, Office Action mailed Mar. 5, 2010, 17 pages.

* cited by examiner

Primary Examiner—Daniel Pan

(57) ABSTRACT

One or more processor cores of a multiple-core processing device each can utilize a processing pipeline having a plurality of execution units (e.g., integer execution units or floating point units) that together share a pre-execution front-end having instruction fetch, decode and dispatch resources. Further, one or more of the processor cores each can implement dispatch resources configured to dispatch multiple instructions in parallel to multiple corresponding execution units via separate dispatch buses. The dispatch resources further can opportunistically decode and dispatch instruction operations from multiple threads in parallel so as to increase the dispatch bandwidth. Moreover, some or all of the stages of the processing pipelines of one or more of the processor cores can be configured to implement independent thread selection for the corresponding stage.

16 Claims, 7 Drawing Sheets

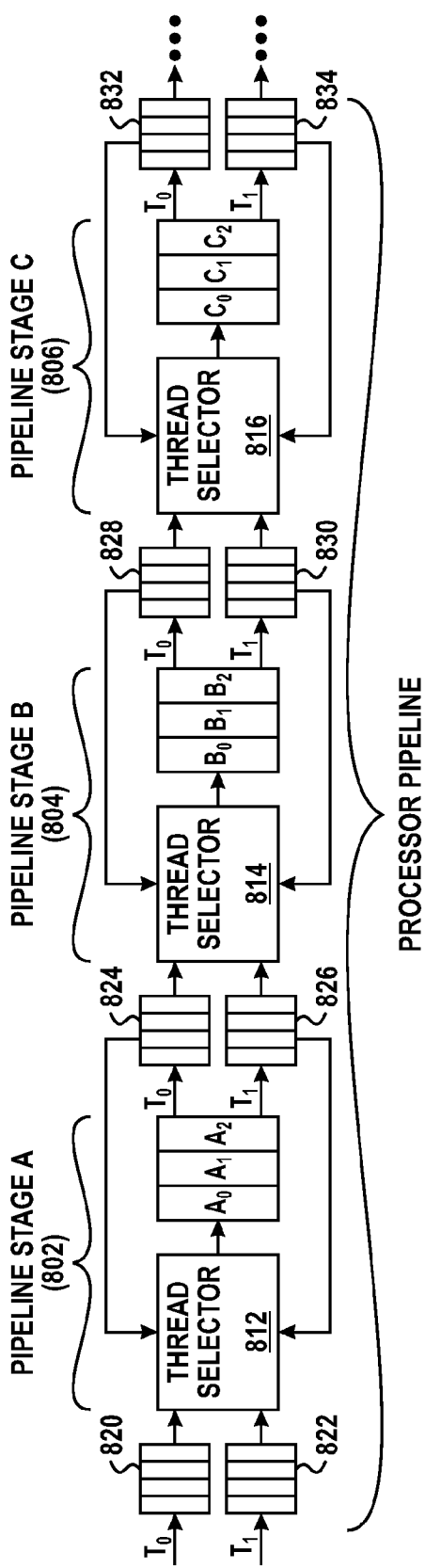
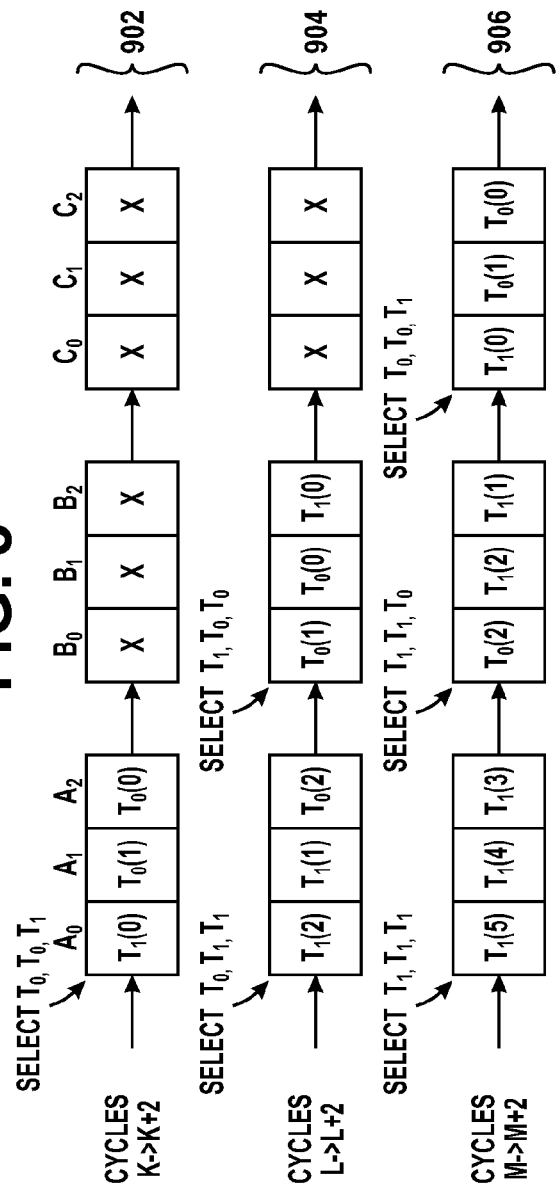
FIG. 8
FIG. 9

PROCESSING PIPELINE HAVING PARALLEL DISPATCH AND METHOD THEREOF

BACKGROUND

1. Field of the Disclosure

The present disclosure is generally directed to instruction processing and, more particularly, to instruction operation dispatch in a processing pipeline.

2. Description of the Related Art

In a conventional processing device having multiple execution units, a single dispatch bus typically is used to transfer instruction operations to each of the execution units. As the aggregate number of instruction operations capable of being executed by the multiple execution units often exceeds the dispatch bandwidth of the dispatch bus, the dispatch process often serves as a bottleneck to limit the overall bandwidth of the processing device. Accordingly, an improved dispatch technique would be advantageous.

BRIEF DESCRIPTION OF THE DRAWINGS

The present disclosure may be better understood, and its numerous features and advantages made apparent to those skilled in the art by referencing the accompanying drawings.

FIG. 8 is a diagram illustrating a processing pipeline comprising a plurality or processing stages that are configured for independent thread selection in accordance with at least one embodiment of the present disclosure.

FIG. 9 is a diagram illustrating an example operation of the processing pipeline of FIG. 8 in accordance with at least one embodiment of the present disclosure.

The use of the same reference symbols in different drawings indicates similar or identical items.

DETAILED DESCRIPTION

Figure 1:
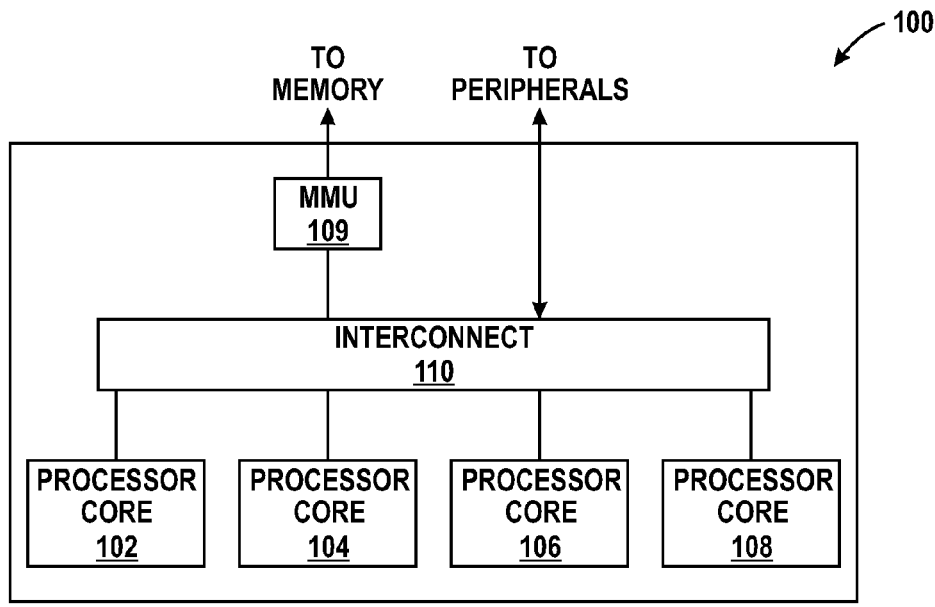
FIG. 1 is block diagram illustrating a processing device comprising a plurality of processor cores in accordance with at least one embodiment of the present disclosure.

FIG. 1 illustrates an example processing device 100 in accordance with at least one embodiment of the present disclosure. The processing device 100 includes a plurality of processor cores (e.g., processor cores 102, 104, 106, and 108) and one or more associated modules (e.g., a memory management unit (MMU) 109) connected via one or more interconnects 110, where the interconnect 110 can include, for example, a bus, a cross-point switch, a bridge (e.g., a north bridge or a south bridge), a HyperTransport™ link, or a combination thereof. The MMU 109 is configured to interface between the processor cores 102, 104, 106, and 108 (hereinafter, processor cores 102-108) of the processing device 100 and one or more memories, such as system memory or an off-chip cache. Although FIG. 1 depicts a processing device having four processor cores for purposes of illustration, it will be appreciated that a different number of processor cores can be implemented without departing from the scope of the present disclosure.

As described in greater detail with reference to FIGS. 2-7, one or more of the processor cores 102-108 each can utilize a processing pipeline having a plurality of execution units (e.g., integer execution units or floating point units) that together share a pre-execution front-end having instruction fetch, decode and dispatch resources. Further, as described with reference to FIGS. 3-5, one or more of the processor cores 102-108 each can implement dispatch resources configured to dispatch multiple instructions in parallel to multiple corresponding execution units via separate dispatch buses. Moreover, as described with reference to FIGS. 8-10, some or all of the stages of the processing pipelines of one or more of the processor cores 102-108 can be configured to implement independent thread selection for the corresponding stage.

Figure 2:
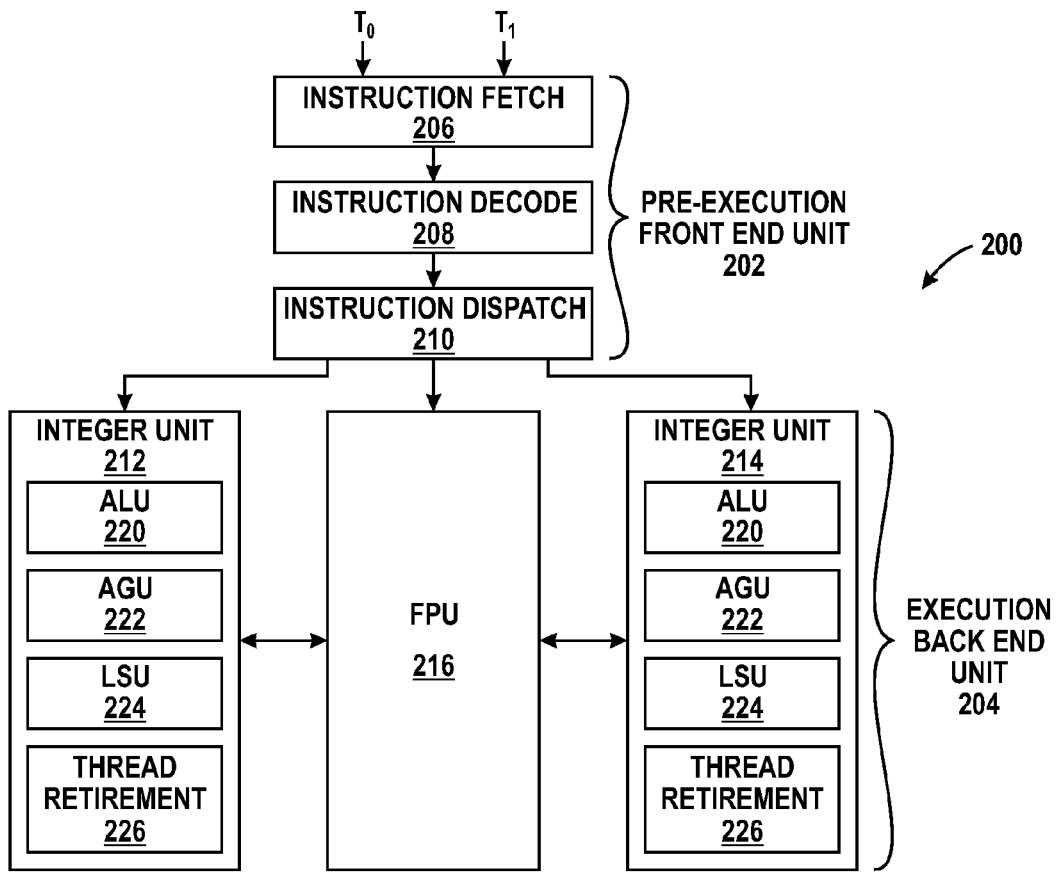
FIG. 2 is a block diagram illustrating a processing pipeline of a processor core having a plurality of integer execution units operable in parallel in accordance with at least one embodiment of the present disclosure.

FIG. 2 illustrates an example processing pipeline 200 of a processor core in accordance with at least one embodiment of the present disclosure. The processing pipeline 200, in one embodiment, represents the processing pipeline implemented at each of one or more of the processor cores 102-108 of FIG. 1.

In the depicted example, the processing pipeline 200 includes a pre-execution front-end unit 202 and an execution back-end unit 204. The pre-execution front-end unit 202 (hereinafter, "front-end unit 202") includes an instruction fetch module 206, an instruction decode module 208, and an instruction dispatch module 210. The instruction fetch module 206, in one embodiment, is configured to fetch instructions associated with one or more threads (e.g., threads $T_0$ and $T_1$) and store the fetched instructions in an instruction fetch buffer (not shown). The instruction fetch module 206 can use any of a variety of fetch/prefetch techniques to fetch instruction data. The instruction decode module 208, in one embodiment, is configured to decode fetched instructions into one or more decoded instruction operations (e.g., microinstructions, or "microcode" operations) and buffer the decoded instruction operations in a decode buffer (not shown). The instruction dispatch module 210, in one embodiment, is configured to dispatch select decoded instruction operations from the decode buffer to various resources of the execution back-end unit 204 (hereinafter, "back-end unit 204") in accordance with various dispatch criteria.

The back-end unit 204, in one embodiment, includes a plurality of integer execution units, such as integer execution units 212 and 214, configured to execute integer instruction operations dispatched by the instruction dispatch module 210. The back-end unit 204 further can include a floating point unit (FPU) 216 configured to execute floating-point operations dispatched by the instruction dispatch module 210. The results of the execution of a floating point operation by the FPU 216 can be provided to either of the integer execution units 212 and 214 for subsequent processing by integer operations dependent on the results, and vice versa.

In one embodiment, the integer execution unit 212 includes at least one data arithmetic logic unit (ALU) 220 configured to perform arithmetic operations based on the integer instruction operation being executed, at least one address generation unit (AGU) 222 configured to generate addresses for accessing data from cache/memory for the integer instruction operation being executed, a scheduler (not shown), a load/store unit (LSU) 224 to control the loading of data from memory/store data to memory, and a thread retirement module 226 configured to maintain intermediate results and to commit the results of the integer instruction operation to architectural state. In one embodiment, the ALU 220 and the AGU 222 are implemented as the same unit. The integer execution unit 212 further can include an input to receive data from the FPU 216 upon which depends one or more integer instruction operations being processed by the integer execution unit 212. The integer execution unit 214 can be similarly configured.

In operation, the integer execution units 212 and 214 and the FPU 216 operate in parallel while sharing the resources of the front-end unit 202. Instructions associated with one or more threads are fetched by the instruction fetch module 206 and decoded by the instruction decode module 208. The instruction dispatch module 210 then can dispatch instruction operations represented by the decoded instructions to a select one of the integer execution unit 212, the integer execution unit 214, or the FPU 216 based on a variety of factors, such as operation type (e.g., integer or floating point), associated thread, loading, resource availability, architecture limitations, and the like. The instruction operations, thus dispatched, can be executed by their respective execution units during the same execution cycle. For floating point operations represented by buffered decoded instructions, the instruction dispatch module 210 determines the dispatch order to the FPU 216 based on thread priority, forward progress requirements, and the like. For integer instruction operations represented by buffered decoded instructions, the instruction dispatch module 210 determines both the dispatch order and which integer execution unit is to execute which integer instruction operation based on any of a variety of dispatch criteria, such as thread association, priority, loading, etc.

To illustrate, assume two threads, $T_0$ and $T_1$, are being processed by the processing pipeline 200. In this case, the instruction dispatch module 210 can be configured to dispatch integer instruction operations associated with thread $T_0$ the integer execution unit 212 and to dispatch integer instruction operations associated with thread T1 to the integer execution unit 214, while floating-point operations from either thread are dispatched to the FPU 216 in an order determined by thread priority, loading of the FPU 216, etc. Once dispatched to their respective execution units, the operations can be executed concurrently in corresponding execution cycles.

Alternately, integer instruction operations can be dispatched to the integer execution units 212 and 214 opportunistically. To illustrate, assume again that two threads To and T1 are being processed by the processing pipeline 200. In this example, the instruction dispatch module 210 can dispatch integer instruction operations from the threads T0 and T1 to either of the integer execution units 212 and 214 depending on thread priority, loading, forward progress requirements, and the like.

In certain instances, the processing pipeline 200 may be processing only a single thread. In this case, the instruction dispatch module 210 can be configured to dispatch integer instruction operations associated with the thread to both integer execution units 212 and 214 based on a predefined or opportunistic dispatch scheme. Alternately, the instruction dispatch module 210 can be configured to dispatch integer instruction operations of the single thread to only one of the integer execution units 212 or 214 and the unused integer execution unit can be shut down or otherwise disabled so as to reduce power consumption. The unused integer execution unit can be disabled by, for example, reducing the power supplied to the circuitry of the integer execution unit, clock-gating the circuitry of the integer execution unit, and the like.

The implementation of multiple integer execution units that execute in parallel and share the same front-end unit 202 facilitates accelerated execution of a single thread through collaboration between the integer execution units. The integer execution units 212 and 214 can be used to implement a run ahead scheme whereby the instruction dispatch module 210 dispatches memory-access operations (e.g., load operations and store operations) to one integer execution unit while dispatching non-memory-access operations to the other integer execution unit. To illustrate, the front-end unit 202 can fetch and decode instructions associated with a thread such that load instructions later in the program sequence of the thread are prefetched and dispatched to one of the integer execution units for execution while the other integer execution unit is still executing non-memory-access instructions at an earlier point in the program sequence. In this way, memory data will already be prefetched and available in a cache (or already in the process of being prefetched) by the time one of the integer execution units prepares to execute an instruction dependent on the load operation.

Another example of a collaborative use of the integer execution units 202 and 204 is for an eager execution scheme whereby both results of a branch in an instruction sequence can be individually pursued by each integer instruction unit. When the correct branch is determined, the integer instruction unit that was tasked with the branch that ultimately was correct can transfer its state to the other integer instruction unit and both integer instructions can then be used for execution of the program stream of the thread. Table 1 illustrates an example eager execution of instructions of a thread:

TABLE 1

| Eager Execution Example | |
|---|---|
| Section | Instructions |
| A | add r1, r2, r1 |
|  | cmp r1, r3 |
|  | jne next |
| B | add r3, 3, r6 |
|  | . . . |
|  | mov r6, r3 |
| C | next: add r3, 6, r1 |
|  | . . . |

As illustrated by Table 1, instruction section A represents the instruction sequence leading to and including the conditional jump instruction (jne), the instruction section C represents the instruction sequence that follows if the jump is taken, and the instruction section B represents the instruction sequence between the conditional jump instruction and the target of the conditional jump instruction (next). In this example, the front-end unit 202 could dispatch the instruction sequence represented by sections A and B (i.e., the program flow in the event that the jump is not taken) to the integer execution unit 212 and dispatch the instruction sequence represented by sections A and C (i.e., the program flow in the event that the jump is taken) to the integer execution unit 214. In the event that it is ultimately determined that the jump is to be taken, the state of the integer execution unit 214, having been executing the correct path, can be transferred to the integer execution unit 212. Conversely, in the event that that it is ultimately determined that the jump is not to be taken, the state of the integer execution unit 212, having been executing the correct path, can be transferred to the integer execution unit 212. More detailed eager execution implementations are described below with reference to FIGS. 6 and 7.

As yet another example, the integer execution units 212 and 214 can be used collaboratively to implement a reliable execution scheme for a single thread. In this instance, the same integer instruction operation is dispatched to both integer execution units 212 and 214 for execution and the results are compared by, for example, the thread retirement modules 226 of each integer execution unit. In the event that the results match, the results of the integer instruction operation are deemed reliable and execution of the next instruction operation proceeds. Otherwise, if there is a mismatch between the results of execution of the same integer instruction operation, the results are deemed unreliable and corrective action is taken, such as by issuing an exception or other interrupt, by executing the integer instruction operation again, etc.

By utilizing multiple integer execution units that share an FPU (or share multiple FPUs) and that share a single pre-processing front-end unit, increase processing bandwidth afforded by multiple execution units can be achieved while reducing or eliminating the design complexity and power consumption attendant with conventional designs that utilize a separate pre-processing front-end for each integer execution unit. Further, because in many instances it is the execution units that result in bottlenecks in processing pipelines, the use of a single shared front-end may introduce little, if any, delay in the processing bandwidth as the fetch, decode, and dispatch operations of the front-end unit often can be performed at a higher instruction-throughput than the instruction-throughput of two or more execution units combined.

Figure 3:
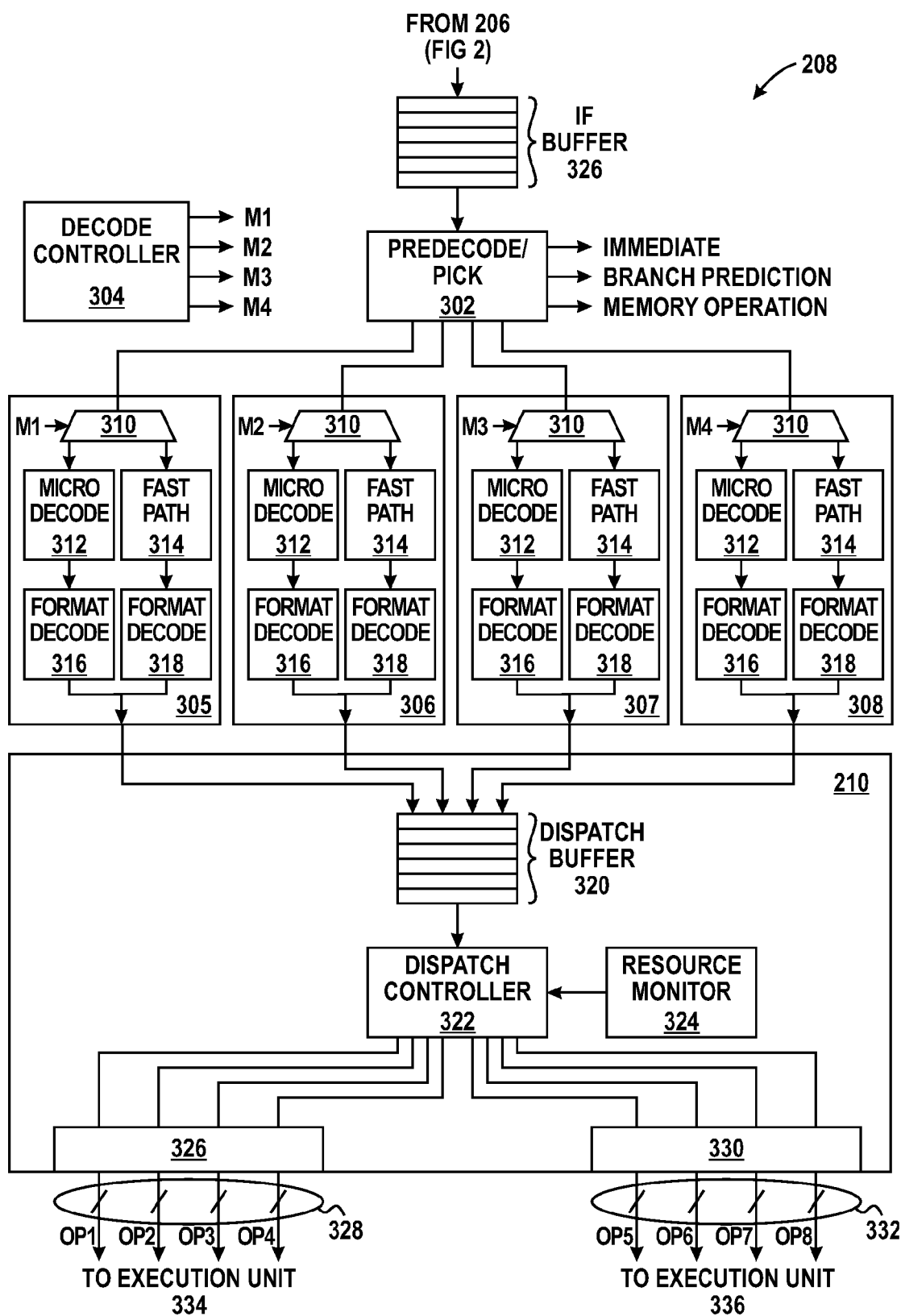
FIG. 3 is a diagram illustrating an example implementation of a portion of a front-end unit of the processing pipeline of FIG. 2 in accordance with at least one embodiment of the present disclosure.

FIG. 3 illustrates an example implementation of the instruction decode module 208 and the instruction dispatch module 210 of the front-end unit 202 in accordance with at least one embodiment of the present disclosure.

In the illustrated embodiment, the instruction decode module 208 includes a predecode/pick module 302, a decode controller 304, and parallel decode paths 305-308. Each of the decode paths includes a demultiplexer 310 or other switch mechanism, a microcode decoder 312, a fastpath hardware decoder 314, and two format decoders 316 and 318, one for the microcode decoder 312 and the other for the fastpath hardware decoder 314.

The instruction dispatch module 208 includes a dispatch buffer 320, a dispatch controller 322, a resource monitor 324, a bus controller 326 coupled to a dispatch bus 328 and a bus controller 330 coupled to a dispatch bus 332. The dispatch bus 328 is coupled to an execution unit 334 (FIG. 4) and the dispatch bus 332 is coupled to an execution unit 336 (FIG. 4), where the execution units 334 and 336 each can include an integer execution unit or a floating point unit. The dispatch buses 326 and 332, in one embodiment, are separate (i.e., no shared conductive bus traces) and each is capable of concurrently transmitting up to N instruction operations to the corresponding execution unit. In the illustrated example, up to four (i.e., N=4) instruction operations can be dispatched on each dispatch bus for any given dispatch cycle.

Figure 4:
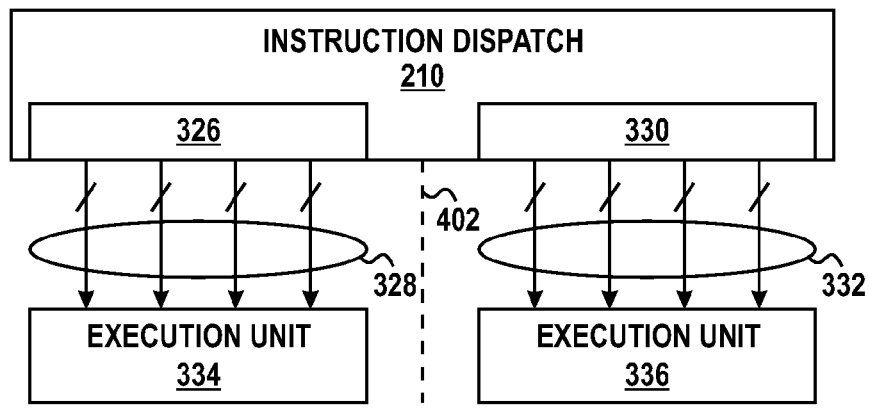
FIG. 4 is a diagram illustrating an instruction dispatch module in accordance with at least one embodiment of the present disclosure.

Referring to FIG. 4, an arrangement of the instruction dispatch module 208, the execution units 334 and 336, and the dispatch buses 328 and 332 is illustrated in accordance with one embodiment of the present disclosure. In prior art systems, the dispatch module is connected to multiple execution buses via a single dispatch bus, which limits the dispatch bandwidth as the execution units together often are capable of issuing more instruction operations than can be provided via a single dispatch bus. Accordingly, as discussed above, in one embodiment the instruction dispatch module 208 utilizes two separate dispatch buses, one for each execution unit, so as to double the maximum number of instruction operations that can be dispatched in any given dispatch cycle. However, it will be appreciated that doubling the number of dispatch buses doubles the number of conductive traces between the dispatch module and the execution units and each conductive trace can unnecessarily consume valuable space if care isn't taken. However, in many implementations, the dispatch module typically is located between the execution units (e.g., collocated or near a center axis 402 between the execution unit 334 and the execution unit 336). In such instances, a prior art implementation of a single dispatch bus would require that the conductive traces of the single dispatch bus extend in both directions from the dispatch module. However, by maintaining the instruction dispatch module 208 between the execution unit 334 and the execution unit 336 as shown in FIG. 4, no increase in the number of routing tracks is needed in comparison with the prior art single dispatch bus implementation because the conductive traces of both dispatch bus 328 and dispatch bus 332 can be positioned in the same number of routing tracks that would have been necessary to extend the conductive traces of a single dispatch bus between the execution units.

Further, by creating point-to-point dispatch buses 328 and 332, a power savings over conventional single dispatch bus implementations can be realized because the conductive trances of the dispatch buses 328 and 332 are shorter than those required for a single dispatch bus implementation. Accordingly, the dispatch buses 328 and 332 have lower parasitic capacitances and thus require less power to drive a signal at the appropriate level.

Figure 5:
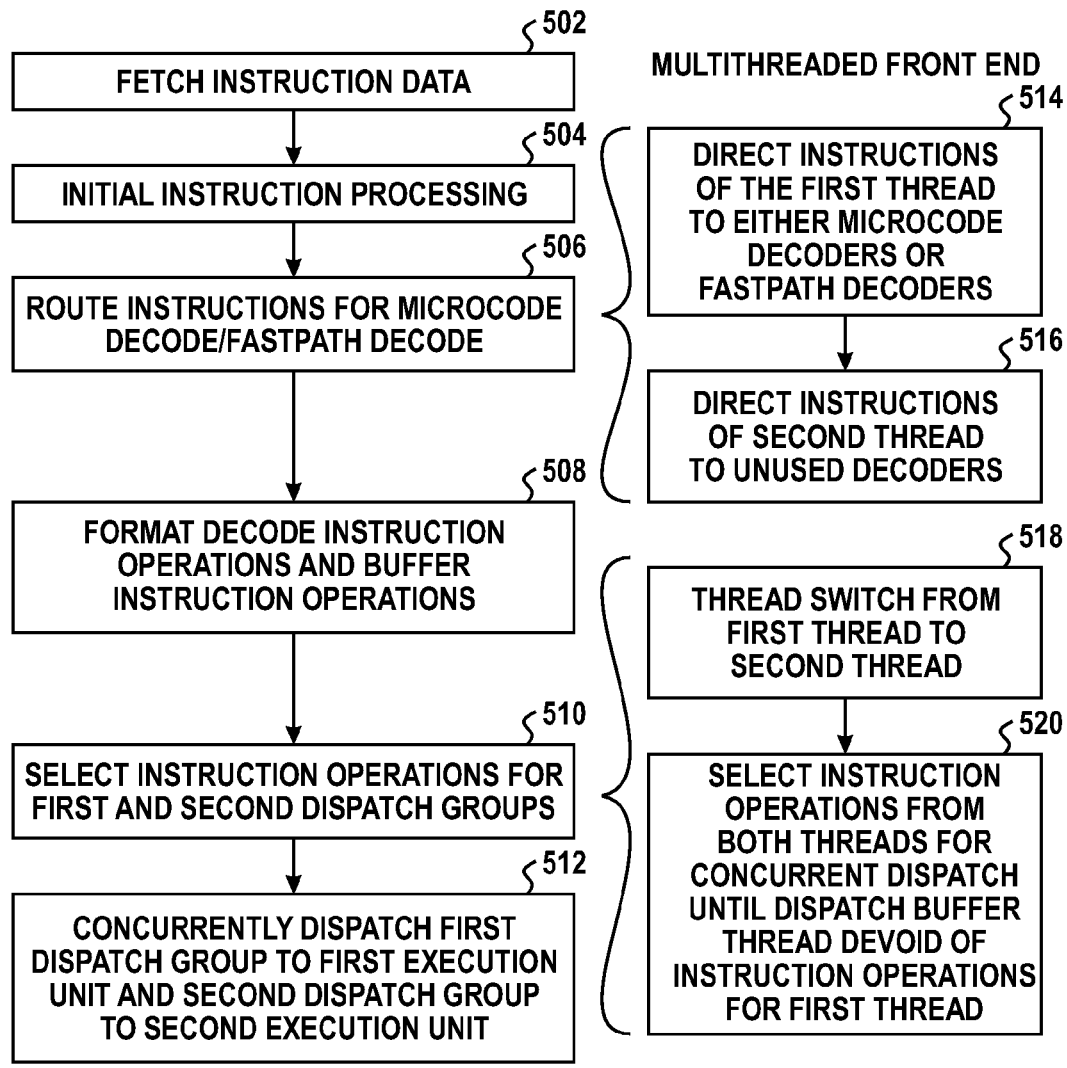
FIG. 5 is a diagram illustrating an example operation of the processing pipeline of FIGS. 2, 3, and 4 in accordance with at least one embodiment of the present disclosure.

Referring to FIG. 5, an example method 500 of operation of the implementation of the front-end unit 200 as represented in FIG. 3 is illustrated in accordance with at least one embodiment of the present disclosure. At block 502, the instruction fetch module 206 (FIG. 1) fetches instruction data into an instruction fetch buffer 326. In at least one embodiment, the instruction data represents one or more instructions with variable lengths, such as instructions in accordance with the x86 instruction architecture. Accordingly, in one embodiment, the instruction data includes one or more start bits and one or more end bits to delineate instructions. At block 504, the predecode/pick module 320 performs initial instruction processing by scanning the instruction data to identify the instruction boundaries and to verify that the represented instruction lengths are correct. Further, the predecode/pick module 320 predecodes the identified instructions to identify certain pertinent characteristics that may affect the processing of the instructions downstream, such as whether the instructions include an immediate field, whether there are any branches, whether an instruction may require a load operation, a store operation, or another memory operation, and the like.

After alignment and predecoding, each instruction is directed to one of the parallel decode paths 305-308 by the decode controller 304 at block 506. Once at one of the decode paths 305-308, the decode controller 304 directs the instruction to either the microcode decoder 312 or the fastpath hardware controller 314 via the multiplexer 310. To illustrate, those instructions requiring more than two instruction operations are directed to the microcode decoder 312, which uses a hierarchy of one or more microcode tables (e.g., read only memories (ROMs)) to convert the received instruction into a set of one or more microcode instruction operations via one or more table look-up operations. Those instructions requiring two or fewer instruction operations can be directed to the fastpath hardware decoder 314 for decoding into a corresponding set of instruction operations.

At block 508, the format decoder 316 and the format decoder 318 perform final decoding on the instruction operations output by the microcode decoder 312 and the fastpath decoder 314, respectively, in preparation for dispatch. This final decoding can include configuring the instruction operations in accordance with an internal dispatch format, applying register renaming, and the like. The formatted instruction operations then are fed to the dispatch buffer 320.

At block 510, the dispatch controller 322 selects instruction operations from the dispatch buffer 320 for inclusion in either a first dispatch group to be dispatched to the execution unit 334 via the dispatch bus 328 or a second dispatch group to be dispatched to the execution unit 336 via the dispatch bus 332. The selection of instruction operations for inclusion in either the first dispatch group or the second dispatch group can be based on any of a variety of characteristics. To illustrate, the execution unit 334 may be dedicated to one thread and the execution unit 336 dedicated to another thread, and thus the dispatch controller 322 selects instruction operations based on which thread they are associated with. Further, in one embodiment, the resource monitor 324 is configured to monitor the availability of downstream resources of the processing device 100 and the selection of instruction operations can be based on resource availability. To illustrate, there may be both dynamic and static restrictions on which instruction operations may dispatch in any given dispatch cycle. Static restrictions result from the architecture of the processing device, such as: a maximum of only two load operations per dispatch group because there are, for example, only two write ports in the load queue (not shown); a maximum of one store operation per dispatch group because there is, for example, only one write port in the store queue (not shown); a maximum of one branch per dispatch group because of, for example, a limitation in the Branch Status Register (not shown); and the like. Dynamic restrictions result from the current resource usage of the processing device 100, such as the number of entries in the integer retirement unit (not shown), the number of checkpoints, the number of scheduler entries, etc.

When the first and second dispatch groups are ready, each between zero and N instruction operations, at block 512 the dispatch controller 322 provides the instruction operations (if any) of the first dispatch group to the dispatch bus controller 328 for transmission via the dispatch bus 328 to the execution unit 334 and concurrently provides the instruction operations (if any) of the second dispatch group to the dispatch bus controller 330 for transmission via the dispatch bus 332 to the execution unit 336 for the current dispatch cycle. The execution units 334 and 336 then schedule their respective instruction operations for execution. The dispatch process of blocks 510 and 512 can be repeated for the next dispatch cycle, and so on.

As discussed herein, the front-end unit 202 can be multithreaded so as to process instructions for two threads for execution. This multithreaded configuration can be used to opportunistically increase the decode/dispatch bandwidth using the implementation illustrated in FIG. 4. To illustrate, as illustrated by FIG. 4, the instruction decoder module 206 includes four decode paths 305-308 that operate in parallel to decode four instructions (macrooperations) in parallel. However, as the decoding of an instruction at any given decode path involves only one of the microcode decoder 312 or the fastpath hardware decoder 314, the other decoder at the decode path otherwise would be idle. However, because the format decode circuitry (format decode modules 316 and 318) is duplicated for both the microcode decoder 312 and the fastpath hardware decoder 314, the decode controller 304 can route instructions from another thread to the otherwise idle decoder of each decode path so that each decode path can decode two instructions in parallel. In other words, an opportunity for increasing decode bandwidth occurs whenever an instruction of one thread is in the microcode decoder 312 such that an instruction of another thread can be provided to the otherwise idle fastpath hardware decoder 314 for parallel decoding, and vice versa. Accordingly, the process represented by block 506 can include directing instructions of a first thread to one of the microcode decoder 312 or the fastpath decoder 314 of each decode path at block 514 and then directing instructions of a second thread to the other decoder of each decode path at block 516 so as to allow both decoders of some or all of the decode paths 305-308 to decode two instructions in parallel.

Another opportunity for increasing the front-end bandwidth occurs whenever there is a thread switch at the front-end unit 202 (FIG. 2). At the time of a thread switch from a first thread to a second thread, there may be a number of instruction operations associated with the first thread in the dispatch buffer 320. In conventional systems, these instruction operations would be flushed in response to the thread switch. However, the dispatch process of block 510 can take advantage of the minimal cost of merely dispatching the already fetched and decoded instruction operations by responding to a thread switch from a first thread to a second thread (block 518) by maintaining the instruction operations of the first thread in the dispatch buffer 320 and selecting from both these instruction operations any instruction operations from the second thread for inclusion in one or both of the first and second dispatch groups until the dispatch buffer 320 is devoid of instruction operations for the first thread, or until some other event, at block 520.

Figure 6:
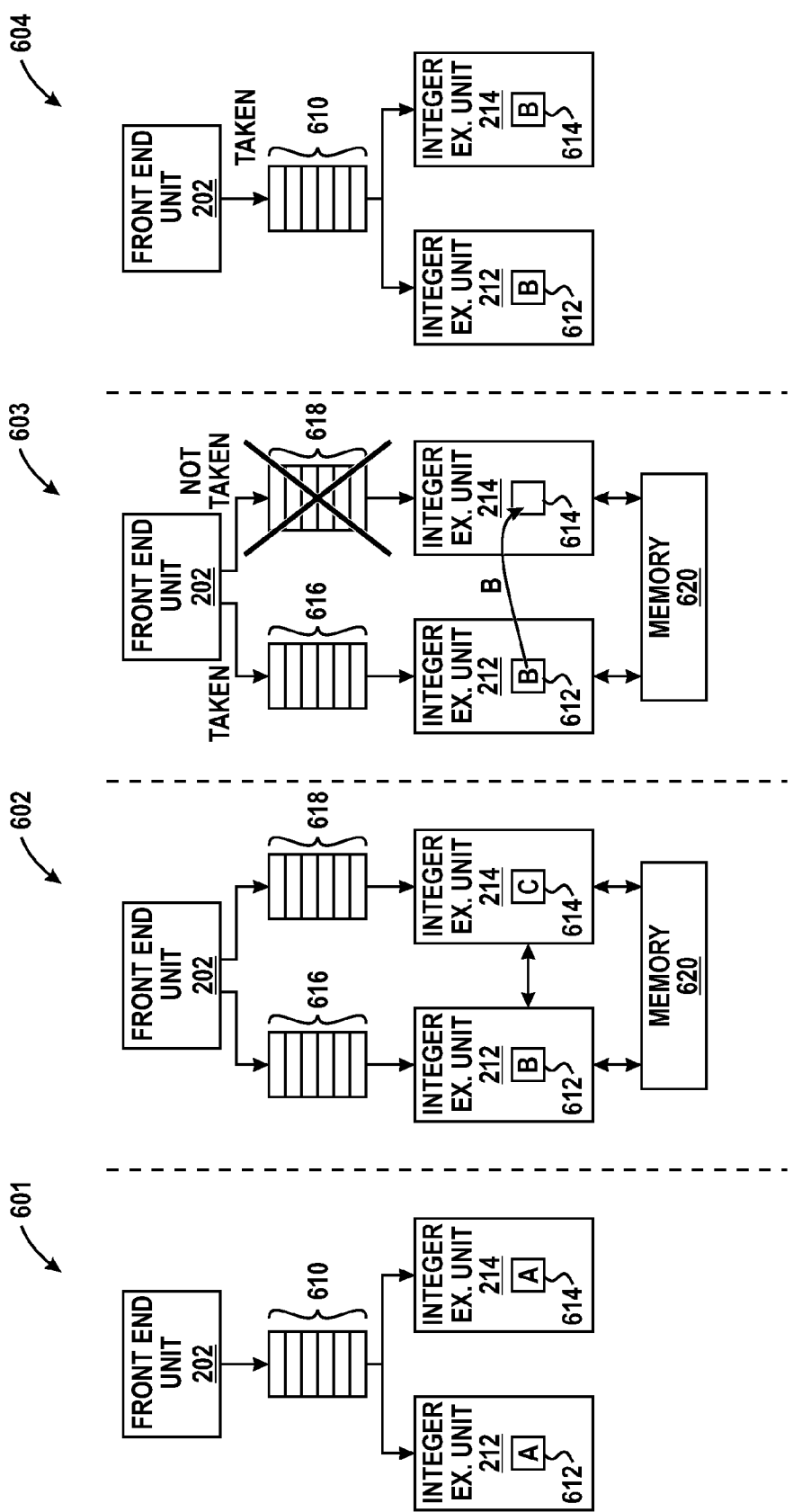
FIG. 6 is a diagram illustrating an example eager execution technique for the processing pipeline of FIG. 2 in accordance with at least one embodiment of the present disclosure.
Figure 7:
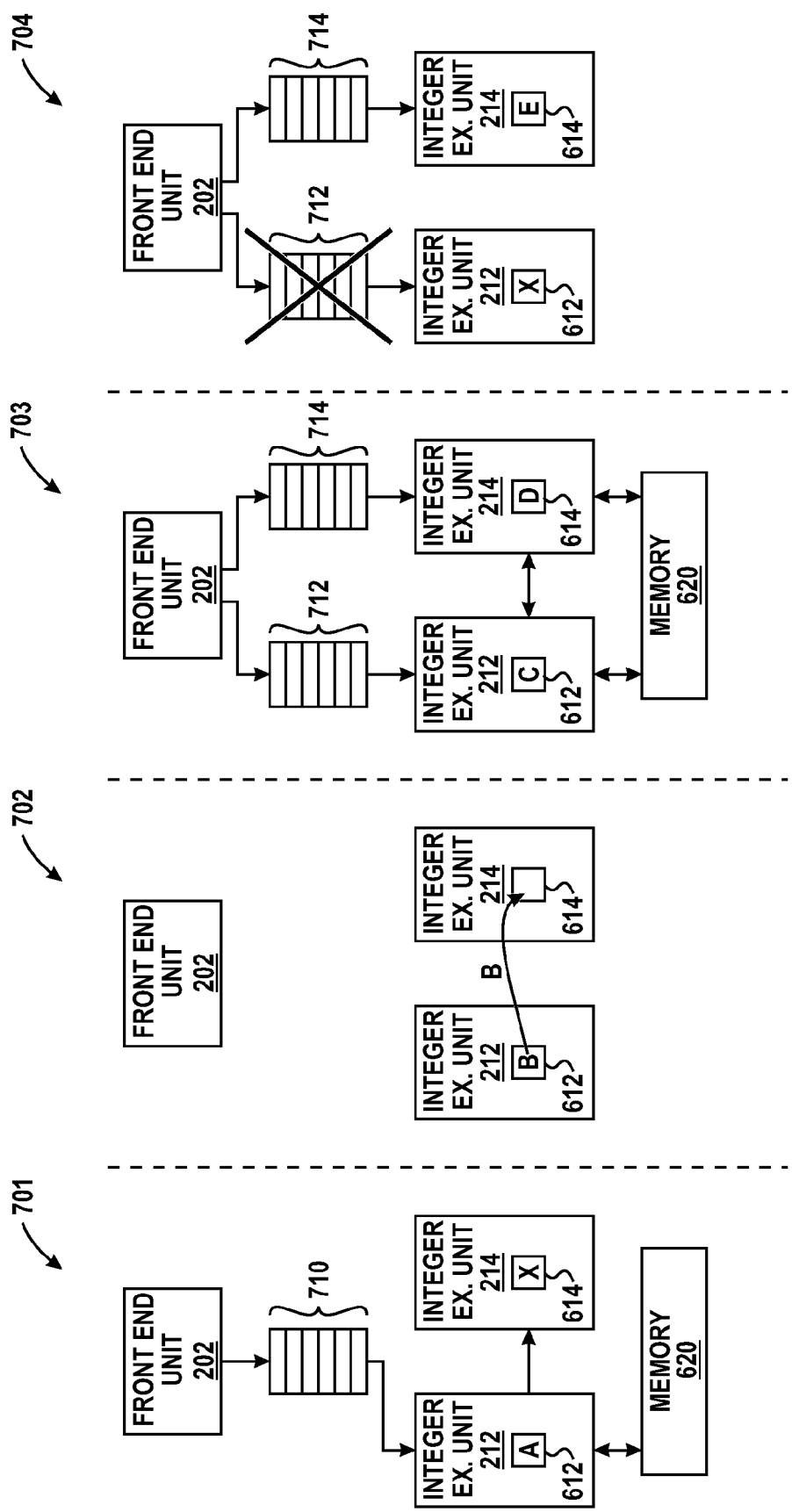
FIG. 7 is a diagram illustrating another example eager execution technique for the processing pipeline of FIG. 2 in accordance with at least one embodiment of the present disclosure.

FIGS. 6 and 7 illustrate example eager execution techniques using the clustered execution unit architecture of FIG. 2 in accordance with at least one embodiment of the present disclosure. Eager execution is a technique frequently to improve single threaded execution by concurrently pursuing both paths of possible execution following a conditional branch. Many branches are difficult to predict and it may be advantageous to fetch and execute down both branch paths rather than making a prediction and continuing with fetch and execution down only the predicted branch path. This mode of execution naturally creates two "streams" of integer operation execution that could each individually be directed to one of the clusters of execution. One path (e.g. the "not-taken" path) could continue to execute on the original cluster, while the "taken" path could begin execution on the other cluster. When the branch is resolved, one path is terminated while the other continues. The difficulty with this use of the previously independent clusters is that they now need to communicate architectural state in order to "fork" two streams from the initial single thread. It is also advantageous to have any cached microarchitectural state (L1 data caches, L1 translation lookaside buffers (TLBs), etc.) be present in both clusters for improved performance for both the taken and not-taken paths.

FIG. 6 illustrates an example implementation to accomplish eager execution in the processing pipeline architecture of FIG. 2. FIG. 6 illustrates a sequence of times 601-604 during the execution of a single thread having a conditional branch that occurs between time 601 and 602. At time 601, the front-end unit 202 has been fetching instruction data associated with the thread and decoding the instruction data to generate a stream 610 of instruction operations, which is dispatched in parallel to both the integer execution unit 212 and the integer execution unit 214. As of time 601, the architectural state 612 of the integer execution unit 212 and the architectural state 614 of the integer execution unit 214 are the same. Accordingly, the integer execution units 212 and 214 execute the instruction operations of the stream 610 in lock-step until a conditional branch is detected in the instruction sequence of the single thread.

In response to the conditional branch, at time 602 the front-end unit 202 fetches first instruction data for the predicted taken branch path and fetches second instruction data for the predicted not-taken branch path. The front-end unit 202 decodes the first instruction data to generate a stream 616 of instruction operations representative of the predicted taken branch path and dispatches the instruction operations of the stream 616 to the integer execution unit 212 for execution. Concurrently, the front-end unit 202 decodes the second instruction data to generate a stream 618 of instruction operations representative of the predicted not-taken branch path and dispatches the instruction operations of the stream 618 to the integer execution unit 214 for execution.

As a result of receiving and executing different instruction operation streams, the architectural state 612 and the architectural state 614 change relative to each other. However, in an effort to maintain minimal consistency at the microarchitecture level, the data obtained from a memory 620 as a result of a cache miss at one of the integer execution units is also provided to the cache of the other integer execution unit so as to keep one or more of the caches of the integer execution units 212 and 214 synchronized.

At time 603, the front-end unit 202 has resolved that the predicted taken branch path (represented by the stream 616) is the actual taken branch path of the conditional branch and therefore terminates any further dispatching of instruction operations of the other stream 618 to the integer execution unit 214. Further, the architectural state 612 is implemented as the architectural state 614 by copying the architectural state 612 over to the integer execution unit 614. The data included in the copied architectural state can include, but is not limited to, register values of one or more registers of the integer execution unit 212 (e.g., general purpose registers) to the corresponding registers of the integer execution unit 214. Other data transferred can include, address translation look-aside buffer (TLB) entries of the integer execution unit 212, the program counter, and the like. The transfer of the architectural state can be accomplished via the execution of a short microcode sequence at the integer execution unit 612, via a dedicated architectural synchronization interface, through the use of emulation memory, and the like.

As a result of the copying or transfer of the architectural state 612 in response to resolution of the conditional branch, the architectural states 612 and 614 are the same and thus the front-end unit 202 dispatches instruction operations of the stream 616 in parallel to both the integer execution unit 212 and the integer execution unit 214 for parallel execution.

FIG. 7 illustrates an alternate implementation for implementation to accomplish eager execution in the processing pipeline architecture of FIG. 2. FIG. 7 illustrates a sequence of times 701-704 during the execution of a single thread having a conditional branch that occurs between time 701 and 702. At time 601, the front-end unit 202 has been fetching instruction data associated with the thread and decoding the instruction data to generate a stream 710 of instruction operations, which is dispatched to only the integer execution unit 212, which executes the instruction operations of the stream 710 until a conditional branch is detected in the instruction sequence of the single thread. During this time, the integer execution unit 214 can be idled or used to execute instruction operations associated with a different thread.

In response to the conditional branch, at time 702 the architectural state 612 is implemented as the architectural state 614 by copying the architectural state 612 over to the integer execution unit 614 using any of the techniques described above. Accordingly, at time 702 both the integer execution unit 212 and the integer execution unit 214 are in the same architectural state in preparation for the conditional branch.

Accordingly, at time 703 the front-end unit 202 fetches first instruction data for the predicted taken branch path and fetches second instruction data for the predicted not-taken branch path. The front-end unit 202 decodes the first instruction data to generate a stream 712 of instruction operations representative of the predicted taken branch path and dispatches the instruction operations of the stream 712 to the integer execution unit 212 for execution. Concurrently, the front-end unit 202 decodes the second instruction data to generate a stream 714 of instruction operations representative of the predicted not-taken branch path and dispatches the instruction operations of the stream 714 to the integer execution unit 214 for execution. As a result of receiving and executing different instruction operation streams, the architectural state 612 and the architectural state 614 change relative to each other. However, in an effort to maintain minimal consistency at the microarchitecture level, the data obtained from a memory 620 as a result of a cache miss at one of the integer execution units is also provided to the cache of the other integer execution unit so as to keep one or more of the caches of the integer execution units 212 and 214 synchronized.

At time 604, the front-end unit 202 has resolved that the predicted not-taken branch path (represented by the stream 714) is the actual taken branch path of the conditional branch and therefore terminates any further dispatching of instruction operations of the other stream 712 to the integer execution unit 712. The integer execution unit 212 then can be idled or used to execute instruction operations from other threads while the integer execution unit 214 continues to execute instruction operations dispatched by the front-end unit 202 for the stream 714 of the original thread.

FIG. 8 illustrates an example processing pipeline 800 having a stage-specific thread selection technique in accordance with at least one embodiment of the present disclosure. For ease of discussion, the following technique is discussed in the context of thread selection for two threads. However, this technique can be extended to thread selection between more than two threads without departing from the scope of the present disclosure. Further, this technique can be used in combination with the techniques described above.

As illustrated, the processing pipeline 800 includes a plurality of pipeline stages, such as pipeline stages A, B, and C (also referred to as pipeline stages 802, 804, and 806, respectively). The pipeline stages A, B, and C correspond to various stages of an instruction pipeline, such as a fetch stage, a decode stage, and a dispatch stage, or a fetch stage, a decode/dispatch stage, and an execution stage, and the like.

Each of the pipeline stages A, B, and C includes a plurality of substages corresponding to a particular operation of the pipeline stage. For example, pipeline stage A includes substages $A_0$, $A_1$, and $A_2$, pipeline stage B includes substages $B_0$, $B_1$, and $B_2$, and pipeline stage C includes substages $C_0$, $C_1$, and $C_2$. Each pipeline stage also includes a thread selector module (thread selector modules 812, 814, and 816 for pipeline stages A, B, and C, respectively). Connected between each pipeline stage is a buffer for a thread $T_0$ and a buffer for a thread $T_1$, where the buffer for a thread stores the instruction data output by the previous pipeline stage resulting from processing of an instruction for the thread by the previous pipeline stage. In the example of FIG. 8, buffer 820 stores instruction data for thread $T_0$ for input to the pipeline stage A and buffer 822 stores instruction data for thread $T_1$ for input to the pipeline stage A; buffer 824 stores instruction data for thread $T_0$ output from pipeline stage A (and for input to pipeline stage B) and buffer 826 stores instruction data for thread $T_1$ output from pipeline stage A (and for input to pipeline stage B); buffer 828 stores instruction data for thread $T_0$ output from pipeline stage B (and for input to pipeline stage C) and buffer 830 stores instruction data for thread $T_1$ output from pipeline stage B (and for input to pipeline stage C); buffer 832 stores data for thread $T_0$ output from pipeline stage C and buffer 834 stores instruction data for thread $T_1$ output from pipeline stage C. Although FIG. 8 illustrates separate buffers for each thread between stages, it will be appreciated that a single buffer can be used for multiple threads between stages.

Each thread selection module includes inputs connected to the buffers at the output of the earlier pipeline stage and an output connected to the input of the first substage of the associated pipeline stage. In FIG. 8, the thread selection module 812 includes inputs connected to the buffers 820 and 822 and an output connected to the input of the substage $A_0$, the thread selection module 814 includes inputs connected to the buffers 824 and 826 and an output connected to the substage $B_0$, and the thread selection module 816 includes inputs connected to the buffers 828 and 830 and an output connected to the substage $C_0$.

In operation, each thread selection module is configured to independently select between thread $T_0$ and thread $T_1$ for processing during each cycle of the processing pipeline 800. To illustrate, at a given cycle, the thread selection module 812 could select instruction data from buffer 820 for thread $T_0$ for processing at substage A0, the thread selection module 814 could select instruction data from buffer 826 for thread $T_1$ for processing at substage B0, and the thread selection module 816 could select instruction data from buffer 830 for thread $T_1$ for processing at substage C0. The particular thread selected for processing at any given processor stage for a pipeline cycle can be determined based on characteristics of the threads (e.g., thread priority, forward progress requirements, etc.), based on the particular instruction operation to be performed at the stage (e.g., number of cycles or substages needed to execute the instruction operation), based on characteristics of the buffers preceding the associated pipeline stage or characteristics of the buffers following the associated pipeline stage, or a combination thereof. To illustrate, in one embodiment, the thread selection modules are configured so as to attempt to maintain approximately equal buffer fullness between threads such that the thread selection module selects the thread having an emptier buffer at the output of the corresponding pipeline stage. For example, assume that the buffer 828 (thread $T_0$) is more full than the buffer 830 (thread $T_1$). The thread selection module 814, in this example, could determine the amount of instruction data stored in each of the buffers 828 and 830 and, noting the difference in amount of buffered instruction data, could select instruction data from the buffer 826 (thread $T_1$) so that the resulting instruction data resulting from its processing at the pipeline stage B will be stored in the buffer 830. In this manner, the likelihood of buffer overflow/underflow conditions can be reduced. In another embodiment, the thread selection modules can select a thread for processing based on a variety of selection methods, such as a round-robin method.

FIG. 9 illustrates an example operation of the processing pipeline 800 in accordance with at least one embodiment of the present disclosure. Pipeline state 902 illustrates which one of threads $T_0$ and $T_1$ is being processed at substages $A_0$, $A_1$, $A_2$, $B_0$, $B_1$, $B_2$, $C_0$, $C_1$, and $C_2$ (hereinafter, substages $A_0$-$C_2$) for processor cycles k through k+2. Pipeline state 904 illustrates which one of threads $T_0$ and $T_1$ is being processed at substages $A_0$-$C_2$ for processor cycles L through L+2. Pipeline state 906 illustrates which one of threads $T_0$ and $T_1$ is being processed at substages $A_0$-$C_2$ for processor cycles M through M+2. For the following, the notation $T_x(Y)$ represents the Yth instruction for thread X.

At cycles K, K+1 and K+2, the thread selection module 812 selects instruction data from thread $T_0$, thread $T_0$, and thread $T_1$, respectively. As a result, substage $A_2$ is processing instruction data from thread $T_0$ (identified as instruction data $T_0(0)$), substage $A_1$ is processing instruction data from thread $T_0$ (identified as instruction data $T_0(1)$), and substage $A_0$ is processing instruction data from thread $T_1$ (identified as instruction data $T_1(0)$) following cycle K+2.

At cycles L, L+1, and L+2, the thread selection module 812 selects thread $T_0$, thread $T_1$, and thread $T_1$, respectively, and the thread selection module 814 selects thread $T_1$, thread $T_0$, and thread $T_0$, respectively. As a result, substage $A_2$ is processing instruction data from thread $T_0$ (identified as instruction data $T_0(2)$), substage $A_1$ is processing instruction data from thread $T_1$ (identified as instruction data $T_1(1)$), and substage $A_0$ is processing instruction data from thread $T_1$ (identified as instruction data $T_1(2)$) following cycle K+2. Further, substage $B_2$ is processing instruction data $T_1(0)$, substage $B_1$ is processing instruction data $T_0(0)$, and substage $B_0$ is processing instruction data $T_0(1)$ following cycle K+2.

At cycles M, M+1, and M+2, the thread selection module 812 selects thread $T_1$ for all three cycles, the thread selection module 814 selects thread $T_1$, thread $T_1$, and thread $T_0$, respectively, and the thread selection module 816 selects thread $T_0$, thread $T_0$, and thread $T_1$, respectively. As a result, substage $A_2$ is processing instruction data from thread $T_1$ (identified as instruction data $T_1(3)$), substage $A_1$ is processing instruction data from thread $T_1$ (identified as instruction data $T_1(4)$), and substage $A_0$ is processing instruction data from thread $T_1$ (identified as instruction data $T_1(5)$) following cycle M+2. Further, substage $B_2$ is processing instruction data $T_1(1)$, substage $B_1$ is processing instruction data $T_1(2)$, substage $B_0$ is processing instruction data $T_0(2)$, substage $C_2$ is processing instruction data $T_0(0)$, substage $C_1$ is processing instruction data $T_0(1)$, and substage $C_0$ is processing instruction data $T_1(0)$ following cycle M+2.

As FIG. 9 illustrates, each pipeline stage can independently select between threads such that, at any given pipeline cycle, the pipeline stage can have instruction data from different threads distributed among its substages. This independent selection at each pipeline stage can facilitate more even progress between threads.

Figure 10:
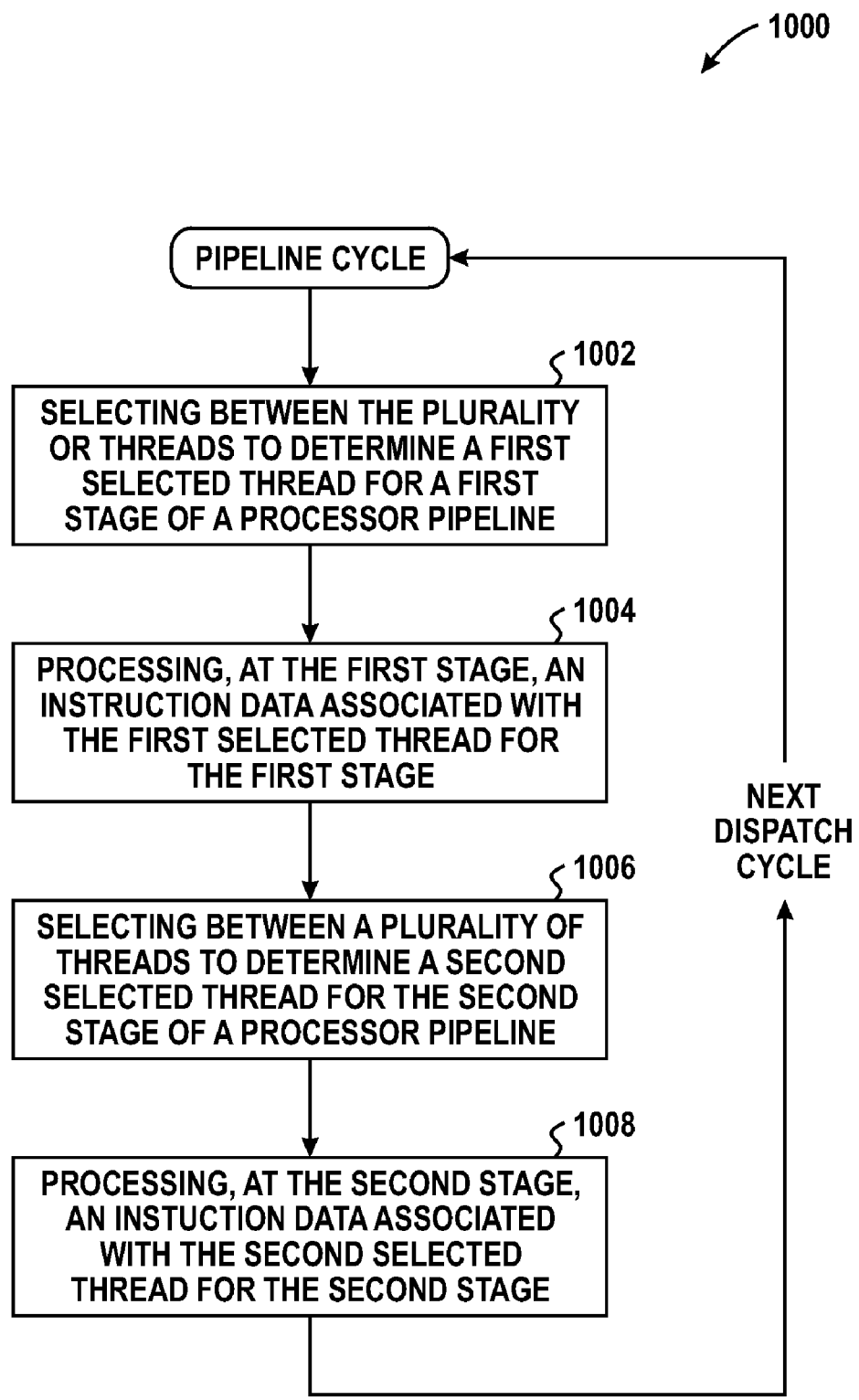
FIG. 10 is a flow diagram illustrating a method for stage-specific thread selection in a processing pipeline in accordance with at least one embodiment of the present disclosure.

FIG. 10 illustrates an example method 1000 for pipeline stage-specific thread execution in accordance with at least one embodiment of the present disclosure. For ease of illustration, method 1000 is described in the context of the processing pipeline 900 of FIG. 9.

For a given pipeline cycle, at block 1002 the thread selection module (e.g., thread selection modules 812, 814, or 816) associated with a first pipeline stage selects a first selected thread from a plurality of threads for processing at the first pipeline stage. At block 1004, instruction data associated with the first selected thread is obtained from the buffer at the output of the previous pipeline stage and is provided to the initial substage of the first pipeline stage for processing during the pipeline cycle. For the same pipeline cycle, at block 1006 the thread selection module associated with a second pipeline stage selects a second selected thread from the plurality of threads for processing at the second pipeline stage. At block 1008, instruction data associated with the second selected thread is obtained from the buffer at the output of the pipeline stage in front of the second pipeline stage and is provided to the initial substage of the second pipeline stage for processing during the pipeline cycle. In at least one embodiment, the process represented by blocks 1002 and 1004 is performed concurrently with the process represented by blocks 1006 and 1008.

In at least one embodiment, the first selected thread and the second selected thread can be the same thread or different threads. The selection of the first selected thread and the selection of the second selected thread can be performed based on thread priority, based on a comparative amount of instruction data buffered for one thread versus another (e.g., based on a ratio of the amount of buffered instruction data for one thread to the amount of buffered instruction data for another thread), based on a round-robin method, or a combination thereof.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A processing device comprising:
    a first execution unit;
    a second execution unit; and
    a front-end unit coupled to the first execution unit via a first dispatch bus and coupled to the second execution unit via a second dispatch bus separate from the first dispatch bus, the first dispatch bus configured to concurrently transmit a first dispatch group of up to N microcode operations from the front-end unit to the first execution unit for a dispatch cycle and the second dispatch bus configured to concurrently transmit a second dispatch group of up to N microcode operations from the front-end unit to the second execution unit for the dispatch cycle;
    wherein the front-end unit comprises:
        a dispatch module coupled to the first dispatch bus and the second dispatch bus, the dispatch module comprising:
            a dispatch buffer configured to buffer microcode operations for dispatch; and
            a dispatch controller configured to select microcode operations from the dispatch buffer for inclusion in the first and second dispatch groups; and
        a decode module comprising a plurality of parallel decode paths, each decode path comprising:
            a microcode decoder comprising a microcode table, the microcode decoder configured to decode an instruction into a set of one or more microcode operations based on the microcode table;
            a first format decoder configured to format each microcode operation output by the microcode decoder according to a dispatch format and provide the resulting formatted microcode operation for storage in the dispatch buffer;
            a fastpath hardware decoder configured to decode an instruction into a set of one or more microcode operations; and
            a second format decoder configured to format each microcode operation output by the fastpath hardware decoder according to the dispatch format and provide the resulting formatted microcode operation for storage in the dispatch buffer.

2. The processing device of claim 1, wherein N is four.

3. The processing device of claim 1, wherein the first execution unit comprises a first integer execution unit and the second execution unit comprises a second integer execution unit.

4. The processing device of claim 1, wherein the first execution unit comprises an integer execution unit and the second execution unit comprises a floating point unit.

5. The processing device of claim 1, wherein the dispatch controller is configured to select microcode operations from the dispatch buffer based on dispatch criteria comprising at least one of: a maximum number of load microcode operations per dispatch group; a maximum number of store nmicrocode operations per dispatch group; a number of available entries in a retirement queue; and a number of available entries in a scheduler queue.

6. The processing device of claim 1, further comprising:
    a decode controller configured to:
        direct instructions of a first thread to the microcode decoders of the decode paths for decoding to generate a first set of microcode operations for the first thread; and
        direct instructions of a second thread to the fastpath hardware decoders of the decode paths for decoding to generate a second set of microcode operations for the second thread concurrent with the generation of the first set of microcode operations; and
    wherein the first dispatch group includes microcode operations from the first set and the second dispatch group includes microcode operations from the second set.

7. The processing device of claim 1, further comprising:
    a decode controller configured to:
        direct instructions of a thread to the microcode decoders of the decode paths for decoding to generate a first set of microcode operations for the thread; and
        direct instructions of the thread to the fastpath hardware decoders of the decode paths for decoding to generate a second set of microcode operations for the thread; and
    wherein the first dispatch group includes microcode operations from the first set and the second dispatch group includes microcode operations from the second set.

8. The processing device of claim 1, wherein the dispatch controller is configured to:
    in response to a thread switch at the processing device from a first thread to a second thread, select microcode operations associated with the first thread from the dispatch buffer for concurrent dispatch with microcode operations associated with the second thread until the dispatch buffer is devoid of microcode operations associated with the first thread.

9. The processing device of claim 1, wherein the dispatch controller is disposed between the first execution unit and the second execution unit.

10. A method comprising:
    providing a processing device comprising a first execution unit, a second execution unit, and a front-end unit coupled to the first execution unit via a first dispatch bus and coupled to the second execution unit via a second dispatch bus separate from the first dispatch bus;

concurrently dispatching a first dispatch group of up to N microcode operations from the front-end unit to the first execution unit via the first dispatch bus for a dispatch cycle and a second dispatch group of up to N microcode operations from the front-end unit to the second execution unit via the second dispatch bus for the dispatch cycle;

decoding instructions of a first thread using a plurality of microcode decoders of the processing device to generate a first set of one or more microcode operations for the first thread;

decoding instructions of a second thread using a plurality of fastpath hardware decoders of the processing device generate a second set of one or more microcode operations for the second thread concurrent with the generation of the first set of microcode operations; and wherein the first dispatch group includes microcode operations from the first set and the second dispatch group includes microcode operations from the second set.

11. The method of claim 10, wherein N is four.

12. The method of claim 10, wherein the first execution unit comprises a first integer execution unit and the second execution unit comprises a second integer execution unit.

13. The method of claim 12, wherein the first execution unit comprises an integer execution unit and the second execution unit comprises a floating point unit.

14. The method of claim 10,
wherein the first dispatch group and the second dispatch group each includes microcode operations from at least one of the first set and the second set.

15. The method of claim 10, further comprising:
in response to a thread switch at the processing device from a first thread to a second thread, concurrently dispatching microcode operations associated with the first thread from and microcode operations associated with the second thread from a dispatch buffer until the dispatch buffer is devoid of microcode operations associated with the first thread.

16. A method comprising:
providing a processing device comprising a first execution unit, a second execution unit, and a front-end unit coupled to the first execution unit via a first dispatch bus and coupled to the second execution unit via a second dispatch bus separate from the first dispatch bus;

concurrently dispatching a first dispatch group of up to N microcode operations from the front-end unit to the first execution unit via the first dispatch bus for a dispatch cycle and a second dispatch group of up to N microcode operations from the front-end unit to the second execution unit via the second dispatch bus for the dispatch cycle; and wherein concurrently dispatching instruction operations comprises selecting microcode operations for dispatch based on dispatch criteria comprising at least one of: a maximum number of load microcode operations per dispatch group; a maximum number of store microcode operations per dispatch group; a number of available entries in a retirement queue; and a number of available entries in a scheduler queue.

\* \* \* \* \*